3,067,191
METTALIZED MONO-AZO DYESTUFFS

Albert Meller North, Huddersfield, and Frederick Walker, Liversedge, England, assignors to L. B. Holliday & Company Limited, Huddersfield, Yorkshire, England, a British company
No Drawing. Filed Oct. 10, 1958, Ser. No. 766,383
Claims priority, application Great Britain Oct. 21, 1957
6 Claims. (Cl. 260—145)

This invention relates to new metallisable mono-azo dyestuffs and their complex heavy metal compounds and their production and also to the dyeing of protein substances such as leather or hair, also natural or synthetic polypeptide fibres such as wool, silk, casein, superpolyamide and superpolyurethane fibres with the metallised mono-azo dyestuffs.

The term "heavy metal" as used herein refers to chromium, cobalt, nickel and iron.

It is known that complex metal compounds of metallisable mono-azo dyestuffs which contain no acid water-solubilising groups such as sulphonic or carboxylic acid groups can be used for the fast dyeing of wool and similar fibres. If such dyestuffs do not contain certain hydrophilic substituents notably —$SO_2NH_2$, the solubility in water, of the various metal complexes, especially chromium and cobalt, vary to such an extent that in some cases the cobalt complex is so slightly soluble in water as to be barely usable as a wool dye, whereas the chromium complex is quite insoluble in water and useless as a wool dye. The introduction of the hydrophilic substituent —$SO_2NH_2$ in some cases produces a dyestuff with an unsatisfactory exhaust from a neutral bath and also results in unsatisfactory fastness qualities. The use of sulphonamide groups which are N-mono and di-substituted by varying alkyl groups often produces dyestuffs of excellent fastness qualities, but having insufficient solubility in water and too rapid rate of absorption on the fibre. The use of sulphonic acid N-aryl-amides is often precluded on account of the poor solubility of the resulting complexes.

It has now been found according to this invention that by the use of sulphonic acid N-di-hydroxy-propyl-alkyl and -aryl amides, metal complex dyestuffs are obtained which are readily soluble in water and can be dyed from neutral or weakly acid baths, giving the required fastness qualities.

The novel metallisable mono-azo dyestuffs of the present invention are compounds of the general formula:

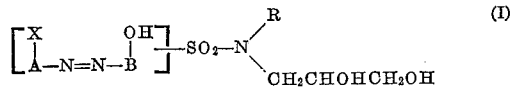

(I)

wherein A is a benzene radical, B is the radical of an azo component, coupling in the ortho position to the hydroxyl or enol group, X is a hydroxyl or carboxyl group in ortho position to the azo group or a substituent which can be converted into such a group under the conditions of the metallising reaction and R is an aliphatic or aromatic residue which may be further substituted by a non-ionic substituent.

The radicals A and B may contain further non-salt-forming substituents, e.g. halogen, alkyl, alkoxy, aryloxy, nitro, acylamino, alkyl-sulphonyl, aryl-sulphonyl, sulphon-di-alkyl-amide, sulphonic acid aryl ester, carboxylic acid ester or carboxyl acid amide.

The present invention also includes novel metallised mono-azo dyestuffs which are heavy metal complexes containing an average of 1 to 1.2 atoms of heavy metal per two molecules of mono-azo dyestuffs of the general Formula I.

The metallised dyestuffs of the present invention can be used for dyeing protein substances such as leather or hair, also natural or synthetic polypeptide substances such as wool, silk, casein, superpolyamide and superpolyurethane fibres from neutral or weakly acid dyebaths because they have suitable absorption rates and are of the required fastness qualities.

The present invention also includes a process for the production of the novel metallised dyestuffs of the present invention wherein a mono-azo dyestuff of the general Formula I is treated with an agent yielding a heavy metal in such an amount that the metallised dyestuff contains an average of from 1 to 1.2 atoms of heavy metal per two molecules of dyestuff.

Examples of amino-benzene derivatives which may be diazotised are as follows:

2 - amino - 1 - hydroxy-benzene-4-sulphonic acid-N-dihydroxypropyl-methyl-amide, which can be prepared by heating 2-nitro - 1 - chlor-benzene-4-sulphonic acid-N-methyl amide with glycerol mono-chlorhydrin in water solution in the presence of alkali with subsequent hydrolysis of the product with caustic soda solution and reduction to the o-amino phenol.
2-amino-1-hydroxy-benzene-5-sulphonic acid-N-dihydroxypropyl-methyl-amide.
2-amino-1-carboxy-benzene-4-sulphonic acid-N-dihydroxypropyl-ethyl-amide.
2-amino-benzoic acid.
2-amino-1-hydroxy-4.6-dinitro-benzene.
2-amino-1-hydroxy-4-methyl-6-nitro-benzene.
2-amino-1-hydroxy-4-chlor-6-nitro-benzene.
2-amino-1-hydroxy-4-chlor-benzene.
2-amino-1-hydroxy-4.6-dichlor-benzene.
4-nitro-2-amino-1-hydroxy-benzene.
5-nitro-2-amino-1-hydroxy-benzene.
4 and 5-nitro-2-amino-anisoles.
2-amino-1-hydroxy-4.6-di-nitro-benzene.
2-amino-1-hydroxy-4-methyl-6-nitro-benzene.
2-amino-1-hydroxy-4.6-dichlor-benzene.

As coupling components there may be mentioned acyl acetic acid arylamides, 5-pyrazolones, phenols and naphthols.

As further examples of coupling components 1-(3'-sulphonic acid-N-di-hydroxypropyl-methyl-amide)-phenyl-3-methyl-5-pyrazolone, 1-naphthol-3-sulphonic acid N-di-hydroxypropyl-N-anilide, 1-naphthol-3-sulphonic acid-N-di-hydroxypropyl-methyl-amide, 1-naphthol-5-sulphonic acid-N-di-hydroxypropyl-N-anilide, 1-naphthol-5-sulphonic acid-N-dihydroxypropyl-ethyl-amide, 4-methyl-1-hydroxy-benzene, 4-octyl-1-hydroxy-benzene, 4-methyl-6-acetylamino-1-hydroxy-benzene, β - naphthol, 6-brom-2-naphthol, 1-acetyl-amino-7-hydroxy-naphthalene, 1-benzoyl - amino-7-hydroxy-naphthalene, 1-phenyl-3-methyl-5-pyrazolone, 1-(3'.4'-dichlor-phenyl)-3-methyl-5-pyrazolone, and acetoacetyl-o-chloranilide.

At least one of the components of the azo dyestuff must contain a sulphonic acid N-dihydroxypropyl-N-alkyl or N-aryl-amide.

The conversion of the mono-azo dyestuffs into the metal complex azo dyestuffs may be carried out with salts of chromium such as chromic fluoride, chromic sulphate, chromic formate in alkaline aqueous suspension and with the salts of cobalt in alkaline aqueous suspension or in an organic medium e.g., formamide. Particularly advantageous is the metallisation in alkaline aqueous medium with complex chromium compounds of oxalic, tartaric and citric acids. The iron and nickel complex compounds may be produced in like manner.

The metal complexes are of the order of 0.5 atom of metal to one molecule of the mono-azo dyestuff.

To obtain varying shades and modified solubility, metal complexes can be obtained using:

(a) Two mono-azo compounds of the general Formula I.

(b) Two mono-azo compounds one corresponding to the general Formula I, and the other, and o, o′-dihydroxy or o-hydroxy-o′-carboxy mono-azo compound, free from sulphonic acid groups, which belong for example to the benzene-azo-benzene, benzene azo-napthalene, benzene azo-pyrazolone, or benzene azo-acyl-acetic acid amide series. The heavy metal complexes so obtained contain an average of from 1 to 1.2 atoms of heavy metal per two molecules of mono-azo dyestuff.

The following examples, in which the parts are by weight unless otherwise stated, illustrate the invention:

*Example 1*

27.6 parts of 2-amino-1-hydroxy-benzene-4-sulphonic acid-N-di-hydroxy-phopyl-methyl-amide were diazotised in the normal manner with hydrochloric acid and sodium nitrite at 0° C. The suspension if diazonium compound was neutralised with sodium bicarbonate and a solution of 24.5 parts of 1-(3′,4′-dichlor-phenyl)-3-methyl-5-pyrazolone in 11 parts of caustic soda 40% wt./vol. and 200 parts of water was added so that the temperature was 0° C. After stirring overnight, the temperature was raised to 80° C. and salt to the extent of 5% of the volume was added. The mixture was cooled and filtered to give Press cake 1.

Press cake 1 was added to 2,000 parts of water and a solution of sodium oxalato chromate equivalent to 3.5 parts of chromium was added. The suspension was refluxed for 12 hours, then the dyestuff was precipitated by the addition of salt, the mixture was cooled, the solid filtered off and dried. The material so obtained dissolved in hot water and dyed wool from a neutral or weakly acid dyebath orange shades. The dyeings had very good fastness to washing, milling, carbonising, stoving, cholorine, perspiration and excellent fastness to light.

*Example 2*

Press cake 1 prepared as in Example 1 was added to 2,000 parts of water and 20 parts by volume of caustic soda 40% wt./vol. To this was added a solution of cobalt chloride equivalent to 3.7 parts of cobalt and heated for 2 hours at 80° C. to 85° C. The dyestuff was precipitated by the addition of salt, cooled, filtered off and dried.

The material so obtained dissolved in hot water and dyed wool from a neutral or weakly acid bath brownish-yellow shades. The dyeings had very good fastness to washing, milling, carbonising, stoving, chlorine, perspiration and excellent fastness to light.

*Example 3*

27.6 parts of 2-amino-1-hydoxy-benzene-4-sulphonic acid N-di-hydroxy-phopyl-methyl-amide were diazotised as in Example 1. The diazonium compound was neutralised by the addition of sodium bicarbonate and a solution of 20.5 parts of a 1-acetylamino-7-hydroxy-naphthalene in 200 parts of water and 11 parts caustic soda 40% wt./vol. were added so that the temperature was 0° C. After stirring overnight the temperature was raised to 80° C. and salt added to the extent of 5% of the volume, the mixture was cooled and the solid filtered off to give Press cake 3.

Press cake 3 was added to 2,000 parts of water and a solution of sodium oxalato chromate equivalent to 3.5 parts of chromium was added. The suspension was refluxed for 12 hours, then the dyestuff was precipitated by the addition of salt, cooled, filtered off and dried. The material so obtained dissolved in hot water from a neutral to weakly acid bath grey shades. The dyeings had very good fastness to washing, milling, carbonising, stoving, chlorine, perspiration and excellent fastness to light.

*Example 4*

27.6 parts of 2-amino-1-hydroxy-benzene-4-sulphonic acid N-dihydroxy-propyl-methyl-amide were diazotised and coupled as in Example 3, to 15 parts of β-naphthol to give Press cake 4.

Press cake 4 was treated with cobalt chloride solution as in Example 2. The material so obtained dissolved in hot water and dyed wool from a neutral or weakly acid bath bordeaux shades. The dyeings had very good fastness to washing, milling, carbonising, stoving, chlorine, perspiration and excellent fastness to light.

*Example 5*

27.6 parts of 2-amino-1-hydroxy-benzene-4-sulphonic acid N-di-hydroxy-propyl-ethyl-amide were diazotised and coupled as in Example 1 to 22 parts of aceto-acetyl-o-chloranilide to give Press cake 5.

Press cake 5 was treated with cobalt chloride as in Example 2. The material dissolved in hot water and dyed wool from a neutral or weakly acid bath in yellow shades. The dyeings had very good fastness to washing, milling, carbonising, stoving, chlorine, perspiration and excellent fastness to light.

*Example 6*

Press cake 1, obtained using 6.9 parts of sodium nitrite and Press cake 3 obtained using 6.9 parts of sodium nitrite were added to 4,000 parts of water, and a solution of sodium oxalato chromate equivalent to 7.0 parts of chromium was added. The suspension was refluxed for 12 hours, then the dyestuff was precipitated by the addition of salt, the mixture cooled, and the solid filtered off and dried.

The material so obtained dissolved in hot water and dyed wool dark-brown shades.

The dyeing had very good fastness to washing, milling, carbonising, stoving, chlorine, perspiration and excellent fastness to light.

*Example 7*

100 parts of wool, 3,000 to 4,000 parts of water and 3 parts of anhydrous sodium sulphate were heated to 40° C. and a solution of 2 parts of the cobaltiferous dyestuff obtained as described in Example 5 in 100 parts of hot water was added. The liquid was raised to the boil during half an hour and maintained at the boil for half an hour. The material was rinsed with cold water and dried.

The material was dyed yellow of excellent fastness to light, acid and alkali, milling, carbonising, decatising, stoving, perspiration, sea water, chlorine and peroxide bleaching.

The same effect was obtained by using 1 to 2 parts of 40% acetic acid or 2 parts of ammonium sulphate in place of the sodium sulphate.

Further metal complex compounds of mono-azo dyestuffs within the invention were prepared and are referred to in Examples 8 to 27 and identified by the particulars given in the following table:

| Example | Diazo compound | Coupling compound | Metal | Dyeing on wool |
|---|---|---|---|---|
| 8 | 2-hydroxy-3-nitro-5-methylaniline (OH, $NO_2$, $NH_2$, $CH_3$ on benzene) | 1-phenyl-3-methyl-5-pyrazolone with phenyl bearing $SO_2$–N($CH_3$)–$CH_2CHOHCH_2OH$ | Cr | Bluish-red. |
| 9 | 2-amino-4-chlorophenol (OH, $NH_2$, Cl on benzene) | 1-hydroxynaphthalene with $SO_2$–N($CH_3$)–$CH_2CHOHCH_2OH$ | Co | Bordeaux. |
| 10 | 2-amino-4-chlorophenol (OH, $NH_2$, Cl) | 1-hydroxynaphthalene with $SO_2$–N($CH_3$)–$CH_2CHOHCH_2OH$ | Cr | Violet. |
| 11 | 2-amino-6-nitro-4-chlorophenol (OH, $NO_2$, $NH_2$, Cl) | 1-hydroxynaphthalene with $SO_2$–N($CH_3$)–$CH_2CHOHCH_2OH$ | Cr | Reddish-blue. |
| 12 | 3-amino-4-hydroxybenzenesulfonamide, $SO_2$–N($C_2H_5$)–$CH_2CHOHCH_2OH$ | 1-(2,4-dichlorophenyl)-3-methyl-5-pyrazolone | Cr | Scarlet. |
| 13 | 2-amino-3,5-dichlorophenol (OH, Cl, $NH_2$, Cl) | 1-hydroxynaphthalene-4-sulfonamide: $SO_2$–N($CH_3$)–$CH_2CHOHCH_2OH$ | Cr | Navy blue. |
| 14 | Anthranilic acid (COOH, $NH_2$) | 1-(2-chloro-5-sulfamoylphenyl)-3-methyl-5-pyrazolone, $SO_2$–N($CH_3$)–$CH_2CHOHCH_2OH$ | Cr | Yellow. |
| 15 | Anthranilic acid (COOH, $NH_2$) | 1-phenyl-3-methyl-5-pyrazolone; phenyl bears $SO_2$–N(–$C_6H_4$–$SO_2CH_3$)–$CH_2CHOHCH_2OH$ | Cr | Lo. |
| 16 | 3-amino-4-hydroxybenzenesulfonamide, $SO_2$–N($C_2H_5$)–$CH_2CHOHCH_2OH$ | 1-hydroxynaphthalene-4-sulfonamide $SO_2$–N($C_2H_5$)$_2$ | Cr | Reddish-blue. |

| Example | Diazo Compound | Coupling Compound | Metal | Dyeing on Wool |
|---|---|---|---|---|
| 17 | OH, NH₂, SO₂, C₂H₅—N—CH₂CHOHCH₂OH (on benzene ring) | OH-naphthalene with SO₂—N(C₂H₅)₂ | Co | Bordeaux. |
| 18 | NO₂, OH, NH₂, SO₂, C₂H₅—N—CH₂CHOHCH₂OH (on benzene ring) | Pyrazolone: OH—C—N—(3,4-dichlorophenyl), H—C, C=N, CH₃ | Cr | Yellowish-red. |
| 19 | Cl, OH, NH₂, SO₂, C₂H₅—N—CH₂CHOHCH₂OH (on benzene ring) | HO-naphthalene | Co | Bordeaux. |
| 20 | OH, NH₂, SO₂, N—C₂H₅, CH₂CHOHCH₂OH (on benzene ring) | Pyrazolone: OH—C—N—(3,4-dichlorophenyl), H—C, C=N, CH₃ | Cr | Orange. |
| 21 | NO₂, OH, NH₂, Cl (on benzene ring) | OH-naphthalene with SO₂—N(C₂H₅)(CH₂CHOHCH₂OH) | Cr | Navy blue. |
| 22 | OH, NH₂, SO₂, N(phenyl)(CH₂CHOHCH₂OH) (on benzene ring) | OH-naphthalene with NHCOCH₃ | Cr | Grey. |

| Example | Compound | Metal | Dyeing on Wool |
|---|---|---|---|
| 23 | Mono-azo 1:<br>OH, NH₂, SO₂, C₂H₅—N—CH₂CHOHCH₂OH (on benzene ring) → COCH₃, CH₂, COHN—(chlorophenyl)<br>Mono-azo 2:<br>OH, NH₂, NO₂ (on benzene ring) → HO-naphthalene with NHCOCH₃ | Co | Olive-green. |

| Example | Compound | Metal | Dyeing on Wool |
|---|---|---|---|
| 24 | Mono-azo 1: anthranilic acid → 1-(4-(N-ethyl-N-(2,3-dihydroxypropyl)sulfamoyl)phenyl)-3-methyl-5-pyrazolone<br><br>Mono-azo 2: 2-amino-4-(N-ethyl-N-(2,3-dihydroxypropyl)sulfamoyl)phenol → 2-naphthol | Cr | Brown. |
| 25 | Mono-azo 1: anthranilic acid → 1-(4-(N-methyl-N-(2,3-dihydroxypropyl)sulfamoyl)phenyl)-3-methyl-5-pyrazolone<br><br>Mono-azo 2: anthranilic acid → 1-(2-methylphenyl)-3-methyl-5-pyrazolone | Cr | Yellow. |
| 26 | Mono-azo 1: anthranilic acid → 1-(2-chloro-4-(N-methyl-N-(2,3-dihydroxypropyl)sulfamoyl)phenyl)-3-methyl-5-pyrazolone<br><br>Mono-azo 2: anthranilic acid → 1-(2-methylphenyl)-3-methyl-5-pyrazolone | Cr | Yellow. |
| 27 | Mono-azo 1: 2-amino-4-(N-ethyl-N-(2,3-dihydroxypropyl)sulfamoyl)phenol → 2-chloroacetoacetanilide<br><br>Mono-azo 2: 2-amino-4-(N-ethyl-N-(2,3-dihydroxypropyl)sulfamoyl)phenol → 2-hydroxy-(acetylamino)naphthalene | Co | Olive green. |

What we claim is:

1. A metallized mono-azo dystuff complex, free from sulfonic acid and carboxylic acid groups, wherein there is an average of 1 to 1.2 atoms of heavy metal per 2 molecules of mono-azo dyestuff, one of the mono-azo dyestuffs having the formula:

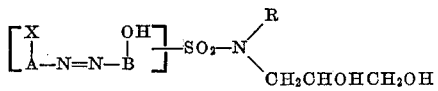

in which A is selected from the group consisting of a benzene radical and a benzene radical substituted by at least one of the following: chlorine atoms, nitro groups, and methyl groups, B is selected from the group consisting of phenyl, naphthyl, pyrazolyl and acetoacetyl phenylamide residues having a hydroxyl group vicinal to the azo linkage and said residues substituted by at least one of the following: chlorine atoms, methyl groups, acetylamino groups, and

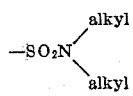

groups, alkyl meaning lower alkyl of 1 to 2 carbon atoms; X is selected from the group consisting of a hydroxyl group, a carboxyl group and a methoxy group convertible to hydroxy in the metallization reaction and R is selected from the group consisting of methyl, ethyl and mononuclear aromatic groups; further characterized in that the group

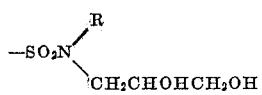

is aromatically bound to one of the A and B groups; and the other of the two mono-azo dyestuffs is selected from the group consisting of a mono-azo dyestuff of the benzene-azo-naphthalene series and the benzene-azo pyrazolone series.

2. A complex chromium compound containing substantially one atom of chromium in complex union with two molecules of the mono-azo dyestuff of the formula:

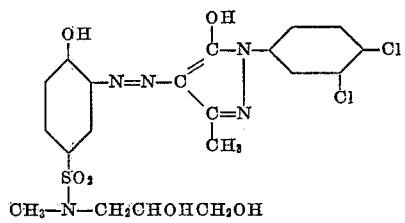

3. A complex cobalt compound containing substantially one atom of cobalt in complex union with two molecules of the mono-azo dyestuff of the formula:

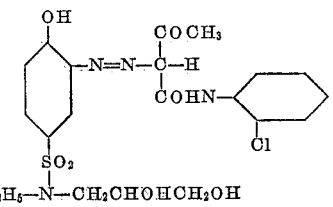

4. A complex cobalt compound containing substantially one atom of cobalt in complex union with two molecules of mono-azo dyestuff, one being of the formula:

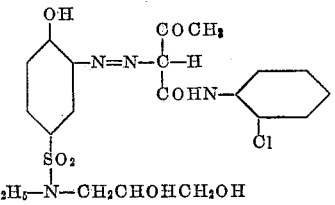

and the other of the formula:

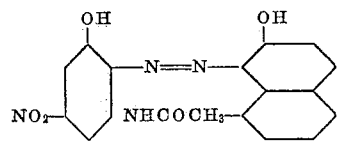

5. A complex cobalt compound containing substantially one atom of cobalt in complex union with two molecules of the mono-azo dyestuff of the formula:

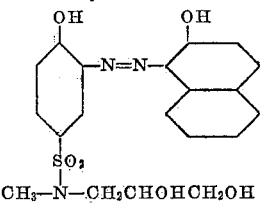

6. A complex chromium compound containing substantially one atom of chromium in complex union with two molecules of the mono-azo dyestuff of the formula:

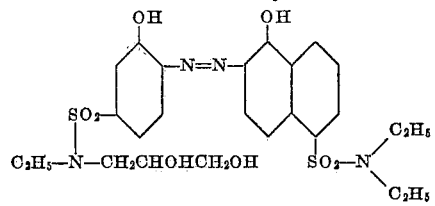

References Cited in the file of this patent

UNITED STATES PATENTS

| | | |
|---|---|---|
| 2,289,349 | Dickey et al. | July 14, 1942 |
| 2,393,652 | Olpin et al. | Jan. 29, 1946 |
| 2,610,175 | Widmer et al. | Sept. 9, 1952 |

FOREIGN PATENTS

| | | |
|---|---|---|
| 149,986 | Austria | June 25, 1937 |